(12) United States Patent
Morita

(10) Patent No.: US 7,202,640 B2
(45) Date of Patent: Apr. 10, 2007

(54) POWER FACTOR IMPROVING CIRCUIT

(75) Inventor: Koichi Morita, Kawagoe (JP)

(73) Assignee: Sanken Electric Co., Ltd. (JP)

( * ) Notice: Subject to any disclaimer, the term of this patent is extended or adjusted under 35 U.S.C. 154(b) by 45 days.

(21) Appl. No.: 10/953,766

(22) Filed: Sep. 29, 2004

(65) Prior Publication Data
US 2005/0068796 A1 Mar. 31, 2005

(30) Foreign Application Priority Data
Sep. 30, 2003 (JP) ............................ P2003-342148

(51) Int. Cl.
*G05F 1/40* (2006.01)
(52) U.S. Cl. ...................... 323/205; 323/285
(58) Field of Classification Search ................ 323/205, 323/285, 207, 222, 282
See application file for complete search history.

(56) References Cited

U.S. PATENT DOCUMENTS 3,913,002 A * 10/1975 Steigerwald et al. .......... 363/18
4,974,141 A * 11/1990 Severinsky et al. ........... 363/81
5,804,950 A * 9/1998 Hwang et al. ............... 323/222
6,531,854 B2 * 3/2003 Hwang ....................... 323/285

FOREIGN PATENT DOCUMENTS

JP 03-284168 12/1991
JP 2000-037072 2/2000

\* cited by examiner

*Primary Examiner*—Shawn Riley
(74) *Attorney, Agent, or Firm*—Kilpatrick Stockton LLP

(57) ABSTRACT

The power factor improving circuit has a current detecting resistor Rsh for detecting current conducting through a set up reactor L1 or current conducting through a switch Q1, an output voltage detector 11 which amplifies a difference between output voltage Eo and reference voltage Vref to generate error voltage, a variable gain amplifier 15 which amplifies voltage which is proportional to current detected by the current detecting resistor Rsh by varying gain in accordance with a value of the error voltage of the output voltage detector 11, and a pulse width modulator 14 which generates a pulse signal whose pulse width is controlled in accordance with a value of output of the variable gain amplifier 15 and which applies the pulse signal to the switch Q1 to control the output voltage Eo to predetermined voltage.

19 Claims, 17 Drawing Sheets

POWER FACTOR IMPROVING CIRCUIT

BACKGROUND OF THE INVENTION

The present invention relates to a simple and inexpensive power factor improving circuit, and more particularly, to a technique of a control circuit of the power factor improving circuit.

FIG. 1 is a block diagram of a conventional power factor improving circuit. In the power factor improving circuit shown in FIG. 1, a series circuit includes a step up reactor L1, a switch Q1 comprising an MOSFET and a current detecting resistor Rsh are connected to both output ends of a full-wave rectification circuit B which rectifies AC current of an AC power supply Vac. A series circuit includes a diode Do and a smoothing capacitor Co is connected to both ends (between a drain and a source) of the switch Q1. A load Ro is connected to both ends of the smoothing capacitor Co. The diode Do and the smoothing capacitor Co constitute a rectification smoothing circuit. The switch Q1 is turned ON/OFF by PWM control of a controller 10.

The current detecting resistor Rsh is connected between a negative side output end P2 of the full-wave rectification circuit B, one end of the switch Q1 and one end of the smoothing capacitor Co. The current detecting resistor Rsh detects input current conducting through the full-wave rectification circuit B.

The controller 10 includes an operational amplifier 11 as an output voltage detector, a multiplier 12, an operational amplifier 13 as a current detector, and a pulse width modulator 14.

The output voltage detector 11 amplifies a difference between voltage of the smoothing capacitor Co and a reference voltage Vref, generates an error voltage and outputs the same to the multiplier 12. The multiplier 12 multiplies the error voltage sent from the output voltage detector 11 by a full-wave rectification voltage sent from a positive output end P1 of the full-wave rectification circuit B, and outputs the multiplied output voltage to a current detector 13.

The current detector 13 amplifies a difference between voltage which is proportional to input current detected by the current detecting resistor Rsh and a multiplied output voltage from the multiplier 12, generates error voltage, and outputs the error voltage to the pulse width modulator 14 as a comparison input signal.

The pulse width modulator 14 inputs a triangular wave signal and the comparison input signal from the current detector 13. The pulse width modulator 14 generates a pulse signal which becomes ON as the value of the comparison input signal becomes equal to or higher than a triangular wave signal and which becomes OFF as the value of the comparison input signal becomes less than the triangular wave signal, and the pulse width modulator 14 applies the pulse signal to a gate of the switch Q1.

Full-wave rectification voltage which is obtained by rectifying input voltage (AC current) of the AC power supply Vac by the full-wave rectification circuit B has a shape of sinusoidal wave which is inverted every half-cycle (half-cycle sinusoidal wave, hereinafter). The multiplier 12 inputs half-cycle sinusoidal wave voltage from the full-wave rectification circuit B, and inputs voltage from the output voltage detector 11, and multiplies these two voltages to change the magnitude of the sinusoidal wave and outputs the same. The current detector 13 compares the half-cycle sinusoidal wave voltage from the full-wave rectification circuit B with voltage Vrsh generated in the current detecting resistor Rsh which is proportional to the input current, and controls such that the input current becomes the half-cycle sinusoidal wave. Therefore, the input current conducting through the current detecting resistor Rsh can be changed to sinusoidal wave similar to the input voltage of the AC power supply Vac every half-cycle and thus, the power factor can be improved.

The operation of the power factor improving circuit having such a structure will be explained. As the switch Q1 is turned ON, current conducts through B→L1→Q1→Rsh. This current is straightly increased with time.

Next, as the switch Q1 is changed from ON to OFF, voltage of the switch Q1 is increased by voltage induced by the step up reactor L1. Further, since the switch Q1 is turned OFF, current conducts through the switch Q1 becomes zero. Thus current conducts through L1→Do→Co, and electricity is supplied to the load Ro.

SUMMARY OF THE INVENTION

However, the step up type power factor improving circuit shown in FIG. 1 has the following three negative feedback loops: (1) a loop in which current is detected by the current detecting resistor Rsh, the current conducts through the current detector 13 and the pulse width modulator 14, the switch Q1 is PWM controlled and the current is controlled; (2) a loop in which output voltage of the smoothing capacitor Co is detected, the current conducts through the output voltage detector 11, the multiplier 11, the current detector 13 and the pulse width modulator 14, the switch Q1 is controlled and the output voltage is controlled; and (3) a loop in which voltage from the full-wave rectification circuit B is detected, the current conducts through the multiplier 12 and the pulse width modulator 14, the switch Q1 is controlled and the output voltage is controlled. For this reason, the number of parts of the power factor improving circuit is large, and it is difficult to stably control the power factor improving circuit. Since the number of parts of the power factor improving circuit is large, adjustment of the circuit becomes complicated.

The present invention provides an inexpensive power factor improving circuit in which the number of parts of the circuit is reduced to simplify its structure, it is easy to adjust the circuit, the number of negative feedback loops is reduced so that the circuit can stably be controlled, and the number of wires can also be reduced.

According to a first technical aspect of the present invention, there is provided a power factor improving circuit in which AC power supply voltage of an AC power supply is rectified by a rectification circuit to obtain rectified voltage, the rectified voltage is inputted to a series circuit comprising a step up reactor and a main switch, the main switch is turned ON/OFF to improve a power factor of the AC power supply, and DC output voltage is obtained by a rectification smoothing circuit, the power factor improving circuit comprising: current detector which detects current conducting through the AC power supply, or current conducting through the rectification circuit, or current conducting through the main switch; an error voltage generator which amplifies a difference between the output voltage and a reference voltage to generate error voltage; a variable gain amplifier which amplifies voltage which is proportional to current detected by the current detector by varying a gain in accordance with a value of the error voltage; and a pulse width control device which generates a pulse signal whose pulse width is controlled in accordance with a value of output of the variable gain amplifier, and applies the pulse signal to the main switch to control the output voltage to predetermined voltage.

According to a second technical aspect of the invention, there is provided a power factor improving circuit which obtains DC output voltage, the circuit comprising: a first series circuit including an AC power supply and a step up reactor; a bridge circuit connected to both ends of the first series circuit and including a first diode, a second diode, a first switch and a second switch; and a smoothing capacitor connected to a connection between the first diode and the second diode, and to a connection between the first switch and the second switch; in which the first switch and the second switch are simultaneously turned ON/OFF to improve a power factor of the AC power supply, the circuit further comprising: a current detector which detects AC power supply current of the AC power supply; a rectification circuit which rectifies the detected AC power supply current; an error voltage generator which amplifies a difference between the output voltage and a reference voltage to generate error voltage; a variable gain amplifier which amplifies voltage which is proportional to current rectified by the rectification circuit by varying gain in accordance with a value of the error voltage; and a pulse width control device which generates a pulse signal whose pulse width is controlled in accordance with a value of output of the variable gain amplifier, and which applies the pulse signal to the first switch and the second switch to control the output voltage to predetermined voltage.

According to a third technical aspect of the invention, there is provided a power factor improving circuit which obtains DC output voltage, the circuit comprising: a first series circuit which is connected to both ends of a rectification circuit which rectifies AC power supply voltage of an AC power supply and which includes a step up reactor, a first switch, a third switch and a current detector; a second series circuit which is connected to a connection between the step up reactor and the first switch and to a connection between the third switch and the current detector and which includes a second switch and a fourth switch; a primary winding of a transformer connected to a connection between the first switch and the third switch and to a connection between the second switch and the fourth switch; and a rectification smoothing circuit which rectifies and smoothens voltage of secondary output winding of the transformer; in which the first to the fourth switches are turned ON/OFF to improve a power factor of the AC power supply, the circuit further comprising: an error voltage generator which amplifies a difference between the output voltage and a reference voltage to generate error voltage; a variable gain amplifier which amplifies voltage which is proportional to current detected by the current detector by varying gain in accordance with a value of the error voltage; a pulse width control device which generates a pulse signal whose pulse width is controlled in accordance with a value of output of the variable gain amplifier; and a switch control device which generates a pulse inverted signal obtained by inverting the pulse signal, which applies one of the pulse signal and the pulse inverted signal to the second switch and the third switch, which applies the other one of the pulse signal and the pulse inverted signal to the first switch and the fourth switch, and which ON/OFF controls the first to the fourth switches to control the output voltage to predetermined voltage.

DESCRIPTION OF THE PREFERRED EMBODIMENTS

Preferred embodiments of a power factor improving circuit according to the present invention will be explained below in detail with reference to the accompanying drawings.

First Embodiment

Figure 1:
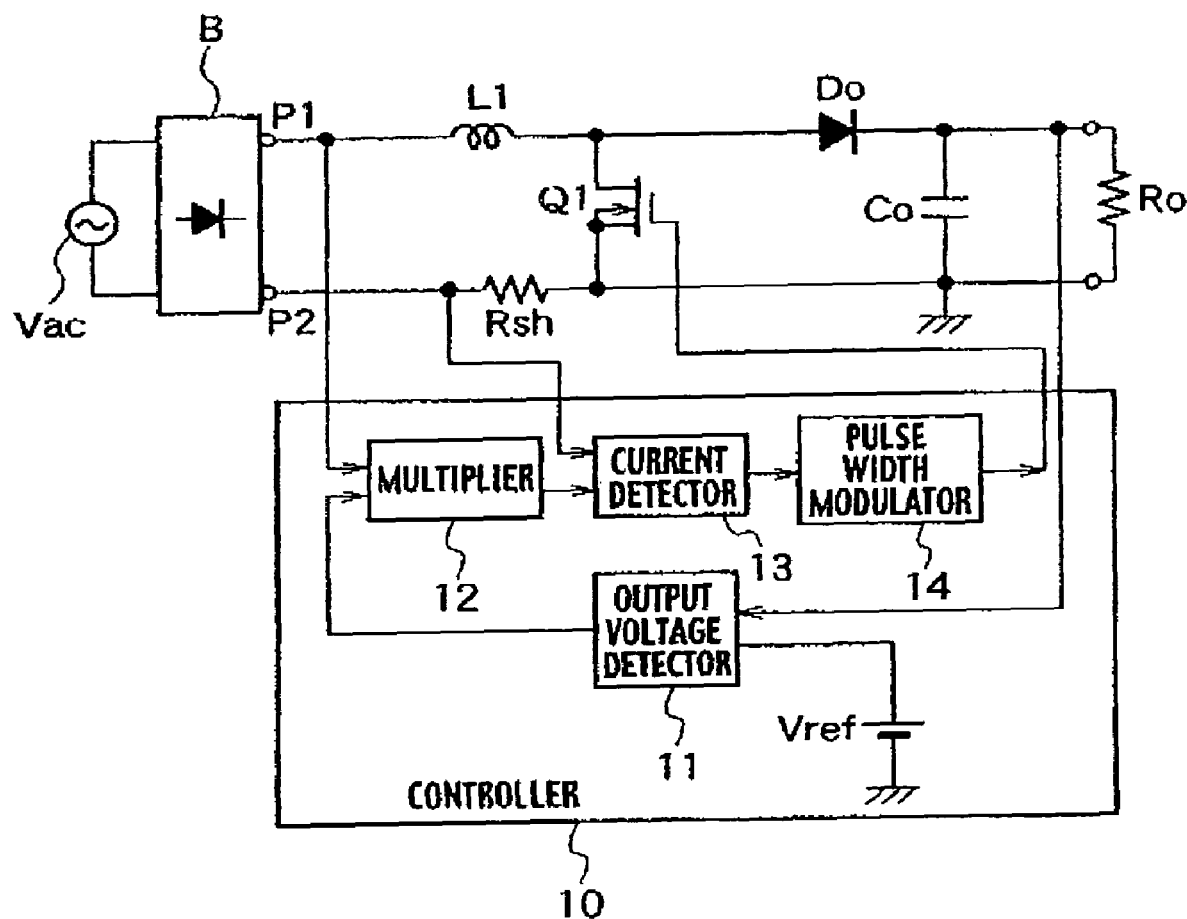
FIG. 1 is a block diagram of a conventional power factor improving circuit.
Figure 2:
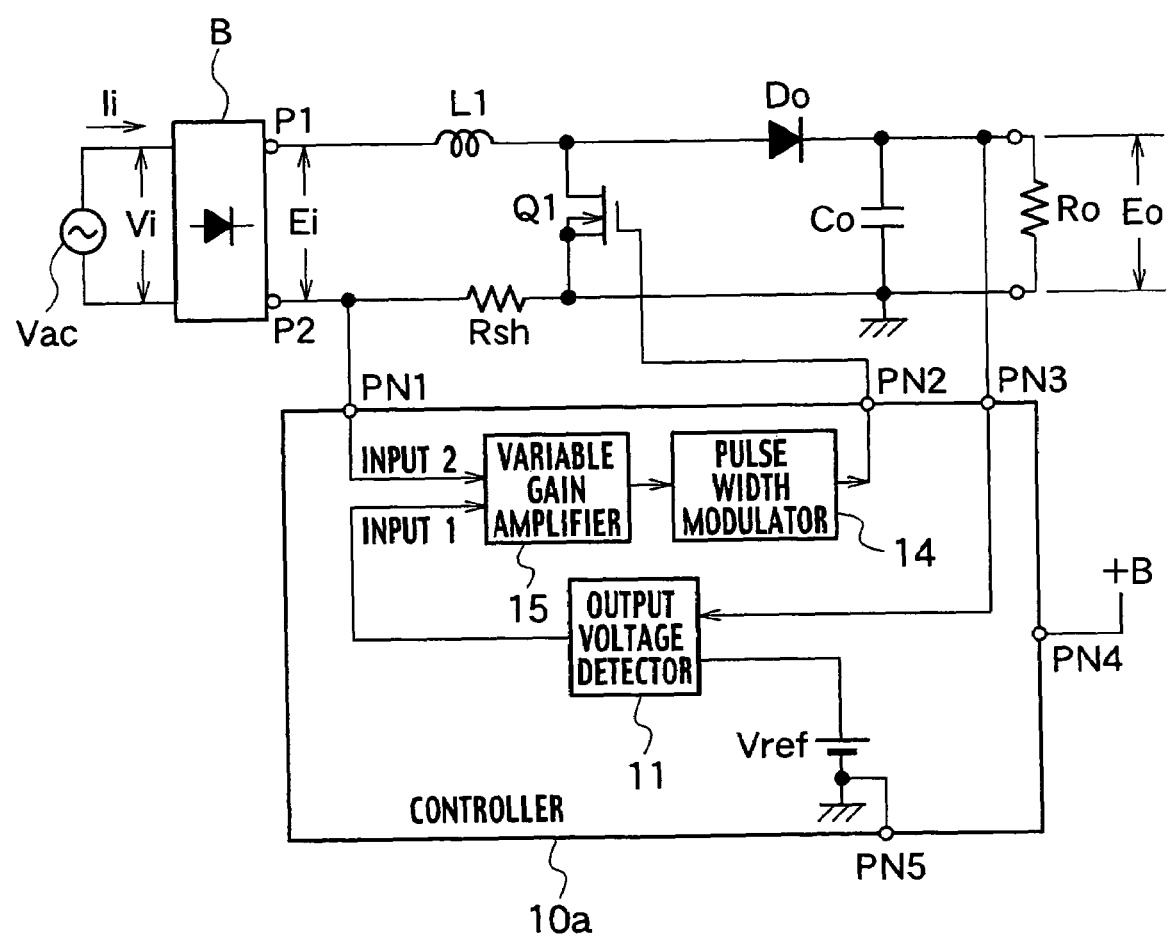
FIG. 2 is a block diagram of a power factor improving circuit according to a first embodiment.

A power factor improving circuit according to the first embodiment shown in FIG. 2 is different from the conventional power factor improving circuit shown in FIG. 1 only in structure of a controller 10a.

Other structures shown in FIG. 2 are the same as those shown in FIG. 1. Like parts are designated with like reference numerals and detailed explanation thereof will be omitted.

The controller 10a includes an output voltage detector 11, a variable gain amplifier 15 and a pulse width modulator 14.

The output voltage detector 11 amplifies a difference between voltage of a smoothing capacitor Co and a reference voltage Vref, generates error voltage and output the same to the variable gain amplifier 15. The variable gain amplifier 15 varies a gain in accordance with a value of the error voltage from the output voltage detector 11, thereby amplifying the voltage which is proportional to the input current detected by the current detecting resistor Rsh, and outputs the amplified output to the pulse width modulator 14 as a comparison input signal. A specific example of the variable gain amplifier 15 will be described later.

Figure 3:
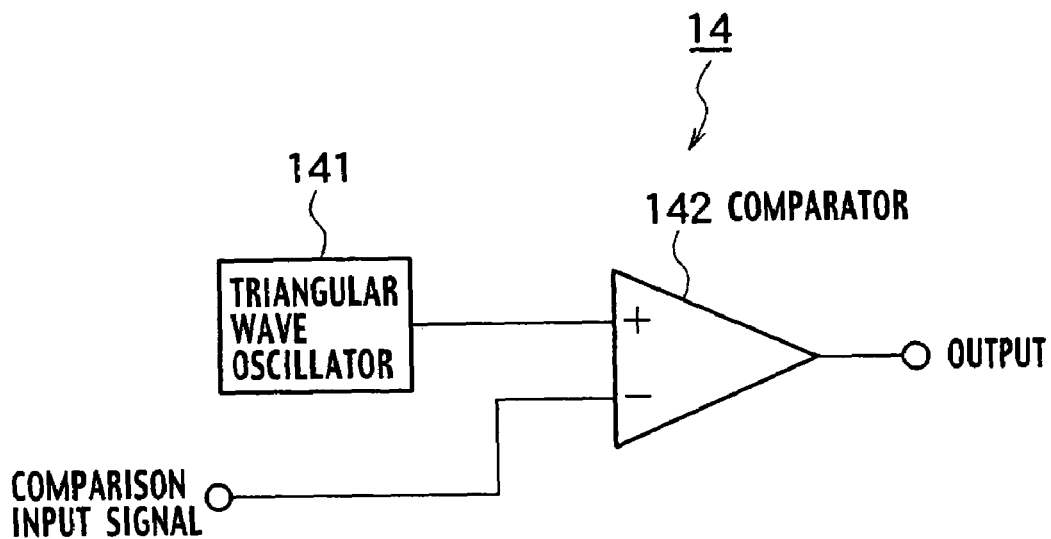
FIG. 3 is a block diagram showing a pulse width modulator provided in a controller in the power factor improving circuit according to the first embodiment.

As shown in FIG. 3, the pulse width modulator 14 includes a triangular wave oscillator 141 which generates a triangular wave signal, and a comparator 142 which compares the triangular wave signal and the comparison input signal with each other. The comparator 142 inputs a triangular wave signal from the triangular wave oscillator 141 to a non-inverted input (+) terminal, inputs a comparison input signal from the variable gain amplifier 15 to an inverted input (−) terminal, and produces a pulse signal which becomes ON (H level) in a case where the value of the triangular wave signal is equal to or greater than the comparison input signal, and which becomes OFF (L level, e.g., zero) in a case where the value of the triangular wave signal is less than the comparison input signal. The pulse signal is applied to a gate of the switch Q1, and the output voltage of the smoothing capacitor Co is controlled to predetermined voltage.

Figure 5A:
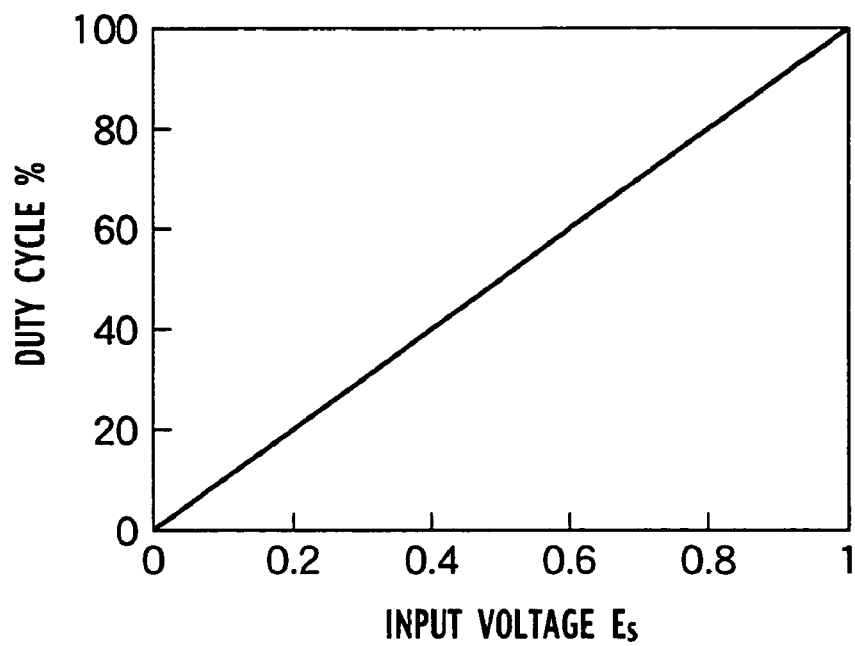
FIGS. 5A and 5B show input and output characteristics of the pulse width modulator.
Figure 5B:
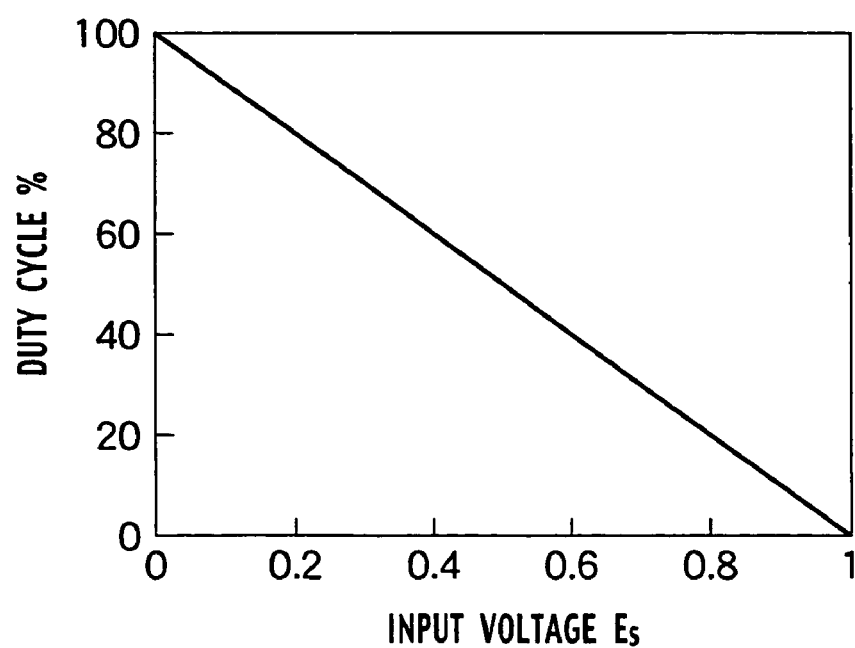

FIGS. 5A and 5B show one example of input and output characteristics of the pulse width modulator. FIG. 5A shows the input and output characteristics of the pulse width modulator in which input voltage Es and duty cycle D are proportional to each other, and Es=D. FIG. 5B shows the input and output characteristics of the pulse width modulator in which the input voltage Es and the duty cycle D has a relationship of Es=1−D.

Figure 4:
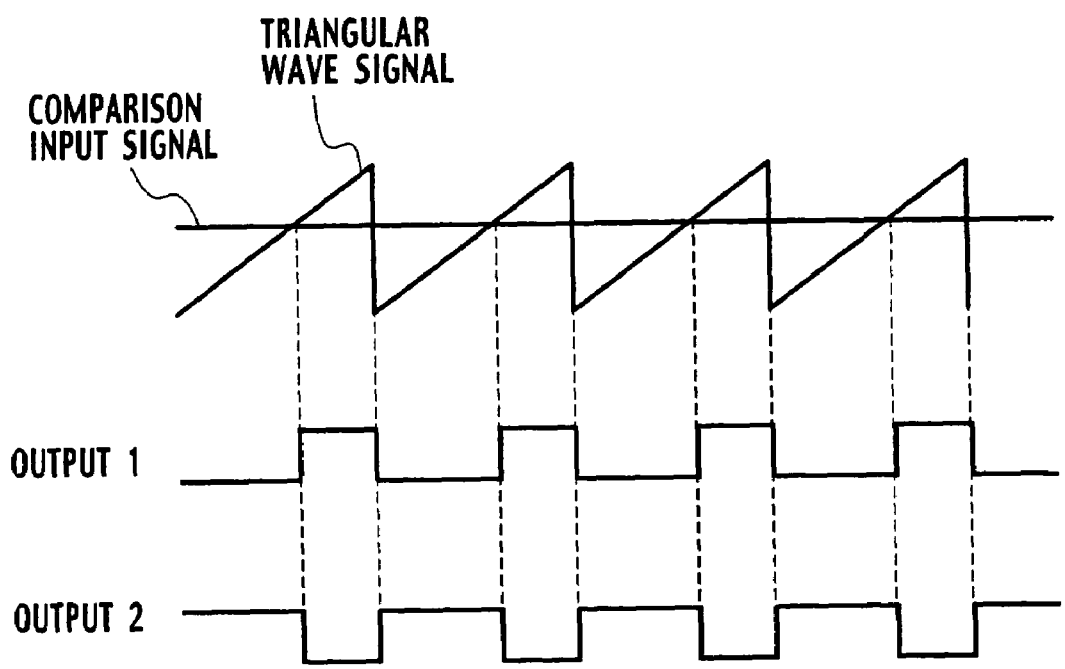
FIG. 4 shows input and output waveform of the pulse width modulator.

According to the pulse width modulator 14 shown in FIG. 3, the input and output waveform assumes a waveform as shown with "output 1" in FIG. 4, and the input and output characteristics of the pulse width modulator 14 are as shown in FIG. 5A.

The comparator 142 produces a pulse signal which becomes ON as the value of the comparison input signal is equal to or greater than the triangular wave signal and which becomes OFF as the value of the comparison input signal is less than the triangular wave signal. The pulse signal may be applied to the gate of the switch Q1 and the output voltage of the smoothing capacitor Co may be controlled to predetermined voltage. That is, if a non-inverted terminal (+) and an inverted terminal (−) of the comparator 142 are connected in an reversed manner, the output voltage is inverted, and the input and output waveform becomes as shown with "output 2" in FIG. 4, and the input and output characteristics are as shown in FIG. 5B.

A principle of operation of the power factor improving circuit according to the first embodiment will be explained next. The operation of the controller 10a will be explained.

First, assuming that the current of the step up reactor L1 conducts continuously, a duty cycle during which the switch Q1 is ON is defined as D, a relation between input voltage Ei which is voltage at both ends of the full-wave rectification circuit B and output voltage Eo which is voltage at both ends of the load Ro is Eo/Ei=1/(1−D). It is noted that the duty cycle corresponds to a ratio T2/T1 as the switch Q1 is ON wherein a switching cycle is defined as T1 and ON time of the switch Q1 is defined as T2.

Assuming that the pulse width modulator 14 has characteristics as shown in FIG. 4 and the input voltage of the pulse width modulator 14 is defined as Es, since Es is equal to 1−D, a relation of Es=1−D=Ei/Eo is established.

Since the output voltage Eo is DC and is a substantially constant value and the input voltage Ei is half-cycle sinusoidal wave, the input voltage Es becomes half-cycle sinusoidal wave. That is, the input voltage Es is an amplified output of the variable gain amplifier 15, and voltage Vrsh of the current detecting resistor Rsh is input to one of input terminals of the variable gain amplifier 15. Thus, the voltage Vrsh of the current detecting resistor Rsh also becomes half-cycle sinusoidal wave. Therefore, input current conducting through the current detecting resistor Rsh becomes half-cycle sinusoidal wave which is proportional to the input voltage Ei and thus, the power factor can be improved.

Output voltage from the output voltage detector 11 is inputted to the other input terminal of the variable gain amplifier 15, and the variable gain amplifier 15 varies the gain in accordance with a value of the output voltage from the output voltage detector 11. For this reason, if the output voltage Eo is reduced by some reason, the output voltage detector 11 reduces the output voltage in accordance with reduction of the output voltage Eo. The variable gain amplifier 15 reduces the gain by the reduction of the output voltage of the output voltage detector 11, outputs a comparison input signal, and increases the average duty cycle D of the pulse signal by the reduction of the comparison input signal from the variable gain amplifier 15 (in the case of output 1 shown in FIG. 4). For this reason, a rate of time during which the switch Q1 is ON is increased, the input current is also increased and thus, the output voltage Eo is increased and the output voltage Eo is maintained at a constant value.

The operation of the entire power factor improving circuit will be explained with reference to waveforms shown in FIG. 6. First, if input voltage Vi of sinusoidal wave of the AC power supply Vac is inputted, input current Ii of sinusoidal wave conducts. The input voltage Vi of the AC power supply Vac is rectified by the full-wave rectification circuit B, and a full-wave rectification voltage Ei is outputted.

Next, as the switch Q1 is turned ON, current conducts through B→L1→Q1→Rsb. Then, as the switch Q1 is changed from ON to OFF, voltage of the switch Q1 is increased by voltage induced in the step up reactor L1. Further, since the switch Q1 is turned OFF, current conducting through the switch Q1 becomes zero. Then the current conducts through L1→Do→Co, and electricity is supplied to the load Ro.

By turning the switch Q1 in predetermined switching frequency in this manner, half-cycle sinusoidal wave current conducts through both ends of the current detecting resistor Rsh. A voltage being proportional to a current conducting through the current detecting resistor Rsh, i.e., negative half-cycle sinusoidal wave voltage shown with "variable gain amplifier input 2" in FIG. 6 is inputted to the one end of the variable gain amplifier 15. Further, output voltage from the output voltage detector 11, i.e., positive DC voltage shown with "variable gain amplifier input 1" in FIG. 6 is inputted to the other end of the variable gain amplifier 15.

The variable gain amplifier 15 amplifies the voltage which is proportional to the input current detected by the current detecting resistor Rsh by varying the gain in accordance with a value of the output voltage from the output voltage detector 11. As shown in FIG. 6, the "variable gain amplifier output" is output as output voltage of half-cycle sinusoidal wave which is similar to the input.

Figure 6:
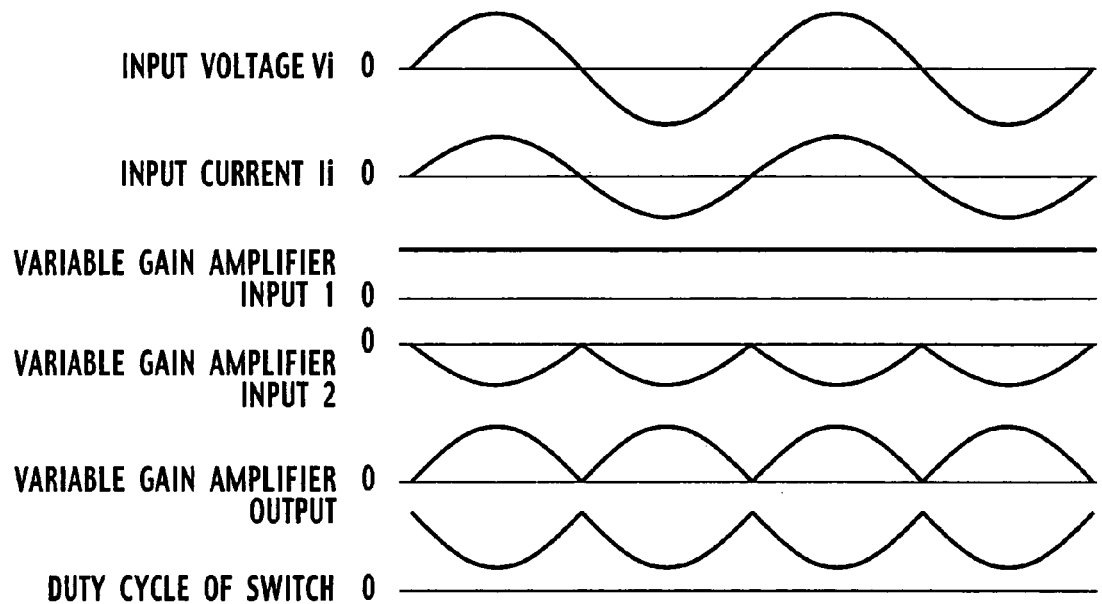
FIG. 6 shows waveforms of various portions of the power factor improving circuit according to the first embodiment.
Figure 7:
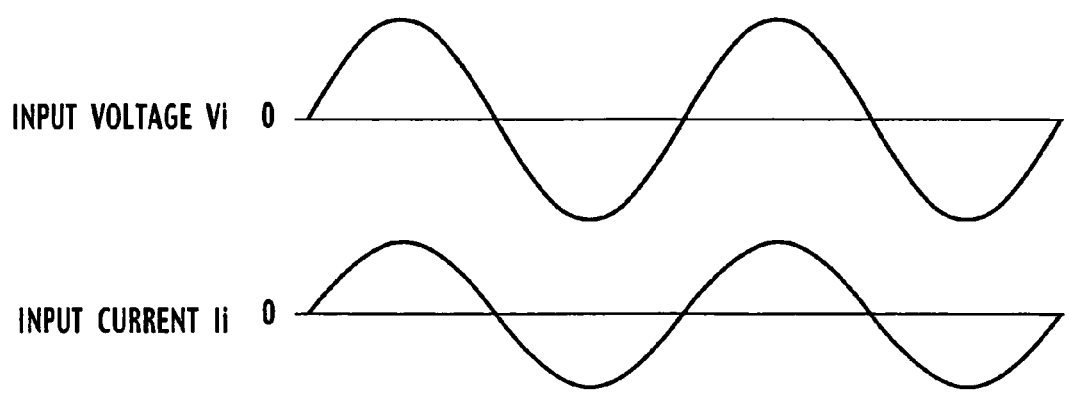
FIG. 7 shows waveforms of input voltage and input current of the power factor improving circuit according to the first embodiment.

Next, "variable gain amplifier output" shown in FIG. 6 is input to the pulse width modulator 14, and the pulse width of the pulse signal is controlled. At this time, since the pulse width modulator 14 has the characteristics as shown in FIG. 5B, the duty cycle of the switch Q1 becomes as shown in FIG. 6. FIG. 7 shows the actual input voltage Vi and input current Ii of the power factor improving circuit. The waveforms shown in FIG. 7 are slightly deviated from the sinusoidal wave in the vicinity of zero current, but the waveforms are extremely similar to the sinusoidal wave, and both the power factor and distortion factor are excellent.

Figure 10:
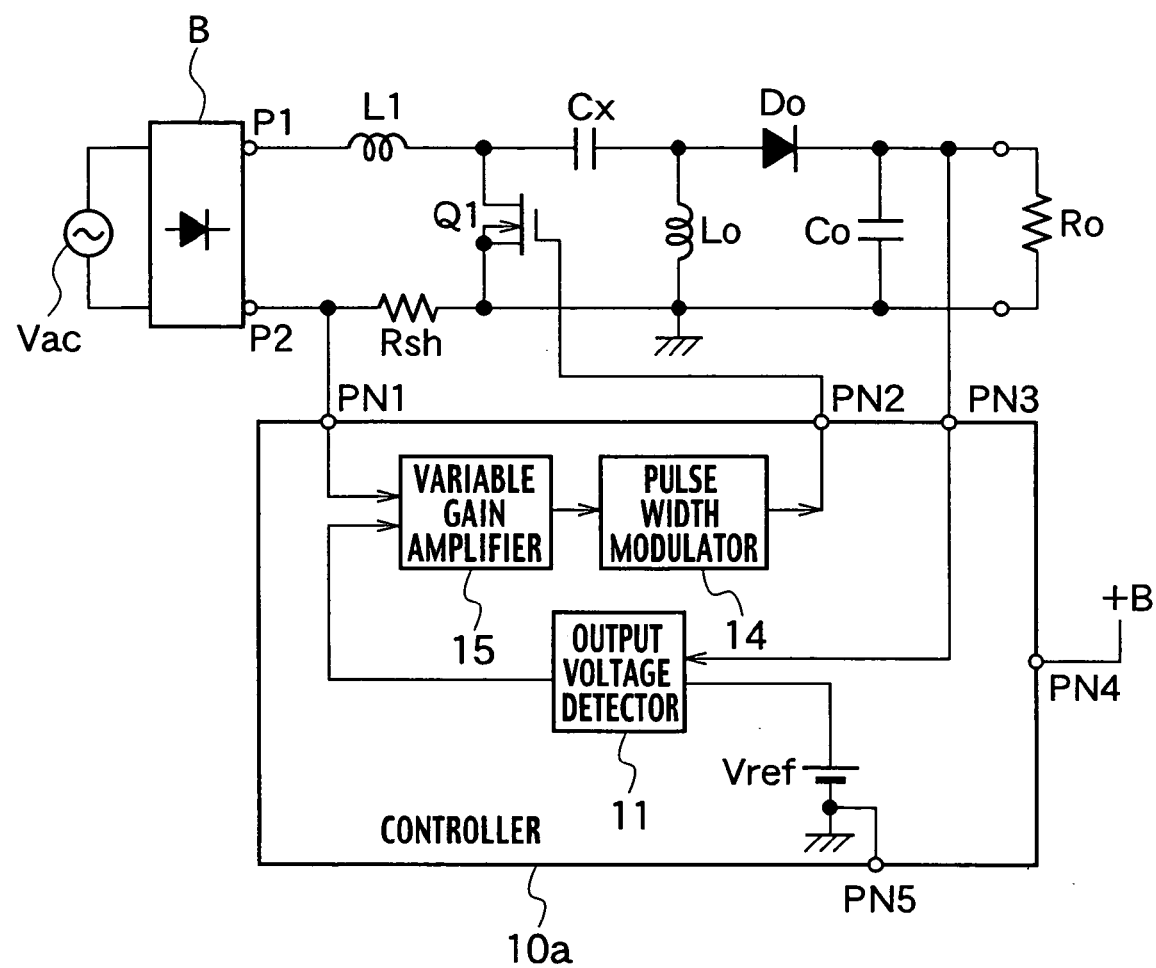
FIG. 10 is a block diagram of a power factor improving circuit according to a fourth embodiment.

In this manner, according to the power factor improving circuit according to the embodiment, the power factor can be improved, the controller 10a only includes the output voltage detector 11, the variable gain amplifier 15 and the pulse width modulator 14, the number of parts of the controller 10a is reduced by one as compared with the controller 10 shown in FIG. 10, and the structure is simplified, the circuit can be produced inexpensively, and it is easy to adjust the circuit.

From the conventional power factor improving circuit shown in FIG. 1, the number of voltage detecting loops which detect voltage from the full-wave rectification circuit B and inputs the voltage to the multiplier 12 can be reduced. Therefore, instability of the controller 10a due to this loop is eliminated, and the circuit can stably be controlled with the two closed loops.

Contact pins PN1 to PN5 are provided in the controller 10a. The contact pin PN1 connects one end of the current detecting resistor Rsh and the variable gain amplifier 15 with each other. The contact pin PN2 connects the gate of the switch Q1 and the pulse width modulator 14 with each other. The contact pin PN3 connects one end of the load Ro and the output voltage detector 11 with each other. The contact pin PN4 is connected to an IC power supply+B and supplies the power supply +B to various portions in the controller 10a. The contact pin PN5 is connected to a negative pole (ground) of the reference voltage Vref. That is, in this embodiment, the number of wires connected to the controller 10a is reduced by one (from the controller 10 shown in FIG. 1) from six to five. With this structure, the controller 10a can easily be formed into an integrated circuit (IC), and an inexpensive IC can be provided. When the controller 10a is formed into the IC, the number of contact pins (PN1 to PN5) of the IC can also be reduced, and the inexpensive IC can be provided.

As described above, according to this embodiment, voltage (sinusoidal wave voltage of half-cycle) which is proportional to the current detected by the current detector and error voltage (DC voltage) from the error voltage generator are inputted to the variable gain amplifier. The variable gain amplifier amplifies voltage which is proportional to current detected by the current detector by varying the gain in accordance with a value of the error voltage of the error voltage generator. Thus, the variable gain amplifier outputs the half-cycle sinusoidal wave output voltage which is similar to the input to a pulse width control device. That is, the input current and the input voltage waveform of the pulse width modulator are similar to each other, the power factor is improved. Further, the three constituent elements, i.e., the error voltage generator, the variable gain amplifier and the pulse width control device suffice. Therefore, the number of parts can be reduced, the structure can be simplified, and the circuit can inexpensively and easily be adjusted. Further, since the number of negative feedback loops can be reduced, the circuit can stably be controlled. Since the number of wires can be reduced, the circuit can easily be formed into IC form, and an inexpensive IC can be provided.

Second Embodiment

Figure 8:
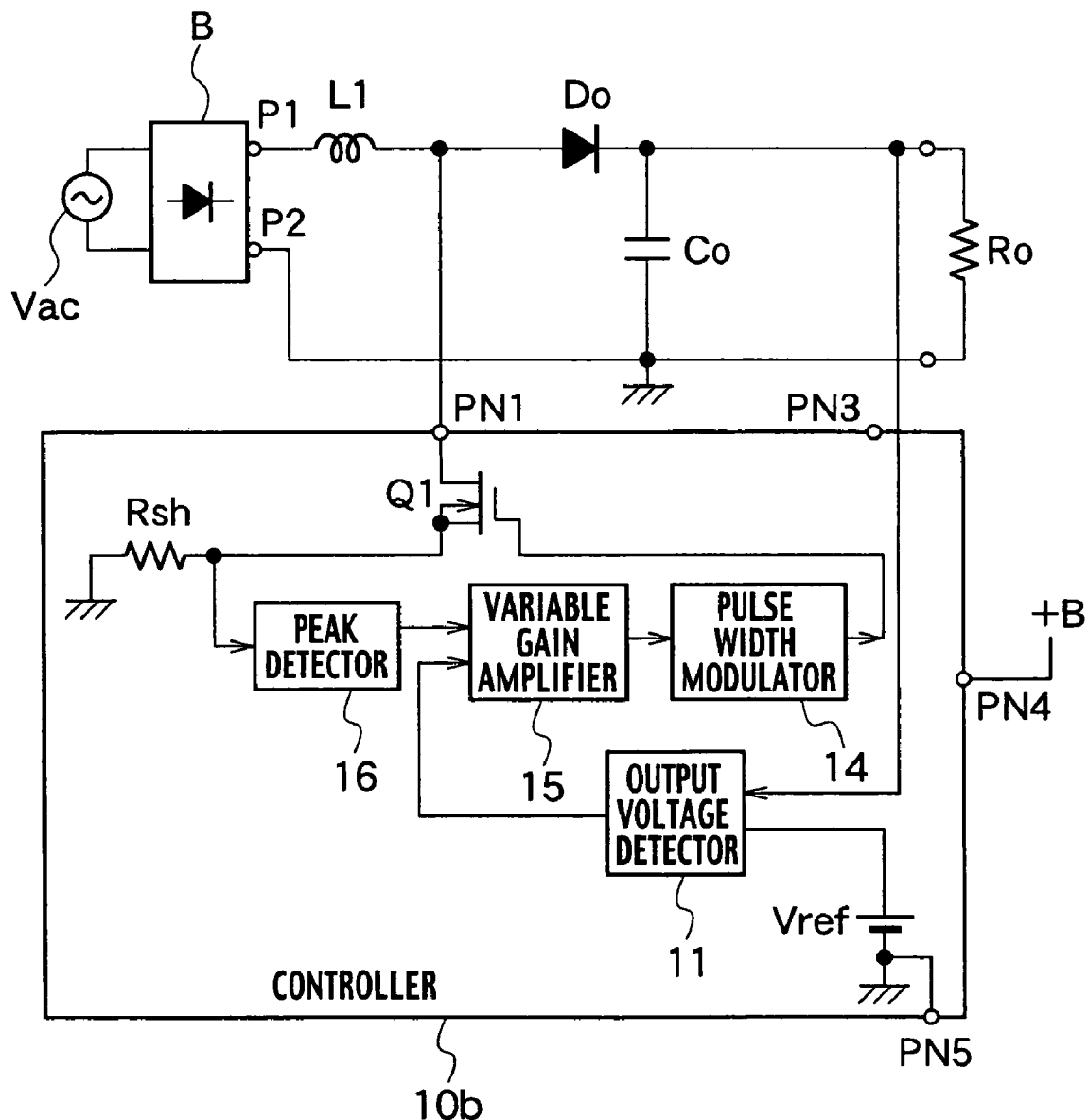
FIG. 8 is a block diagram of a power factor improving circuit according to a second embodiment.

FIG. 8 is a block diagram showing a power factor improving circuit according to a second embodiment. The second embodiment is different from the first embodiment shown in FIG. 2 in the current detector method of the input, and current conducting through the switch Q1 is detected in the second embodiment.

In the power factor improving circuit shown in FIG. 8, a series circuit comprising a step up reactor L1, a diode Do and a smoothing capacitor Co is connected to both output ends of a full-wave rectification circuit B which rectifies AC current of an AC power supply Vac. A load Ro is connected to both ends of the smoothing capacitor Co.

A controller 10b includes a switch Q1, a current detecting resistor Rsh, a peak detector 16, an operational amplifier 11 as an output voltage detector, a variable gain amplifier 15, and a pulse width modulator 14.

One end (drain) of the switch Q1 is connected to a connection between a step up reactor L1 and an anode of a diode Do through a contact pin PN1. The other end (source) of the switch Q1 is grounded through a current detecting resistor Rsh. A peak detector 16 inputs voltage which is proportional to current conducting through the current detecting resistor Rsh, detects a peak value of the input voltage and outputs the same as peak voltage. The variable gain amplifier 15 amplifies the peak voltage from the peak detector 16 by varying the gain in accordance with a value of the error voltage from the output voltage detector 11, and outputs the amplified output to the pulse width modulator 14 as a comparison input signal.

According to the power factor improving circuit of the second embodiment, even if the input current is sinusoidal wave of AC power supply frequency, since the switch Q1 is turned ON/OFF at the switching frequency, i.e., at frequency which is sufficiently higher than the AC power supply frequency, drain current conducting through the switch Q1 is also turned ON/OFF. Thus, the average current of the drain current does not become sinusoidal wave.

For this reason, the peak detector 16 samples a peak value of voltage of the current detecting resistor Rsh every switching frequency and outputs peak voltage in which a curve connecting the peak values becomes the sinusoidal wave. That is, the peak voltage can assume sinusoidal wave which is substantially the same as the input current. The input current can be controlled to have the sinusoidal waveform by inputting the peak voltage from the peak detector 16 to the variable gain amplifier 15.

In the controller 10b, the number of wires is only four, and the number of contact pins is also only four. The controller 10b comprises the switch Q1, the current detecting resistor Rsh, the peak detector 16, the output voltage detector 11, the variable gain amplifier 15 and the pulse width modulator 14, and if the controller 10b is formed into the IC form, the structure of the circuit is further simplified and becomes further inexpensive.

Third Embodiment

Figure 9:
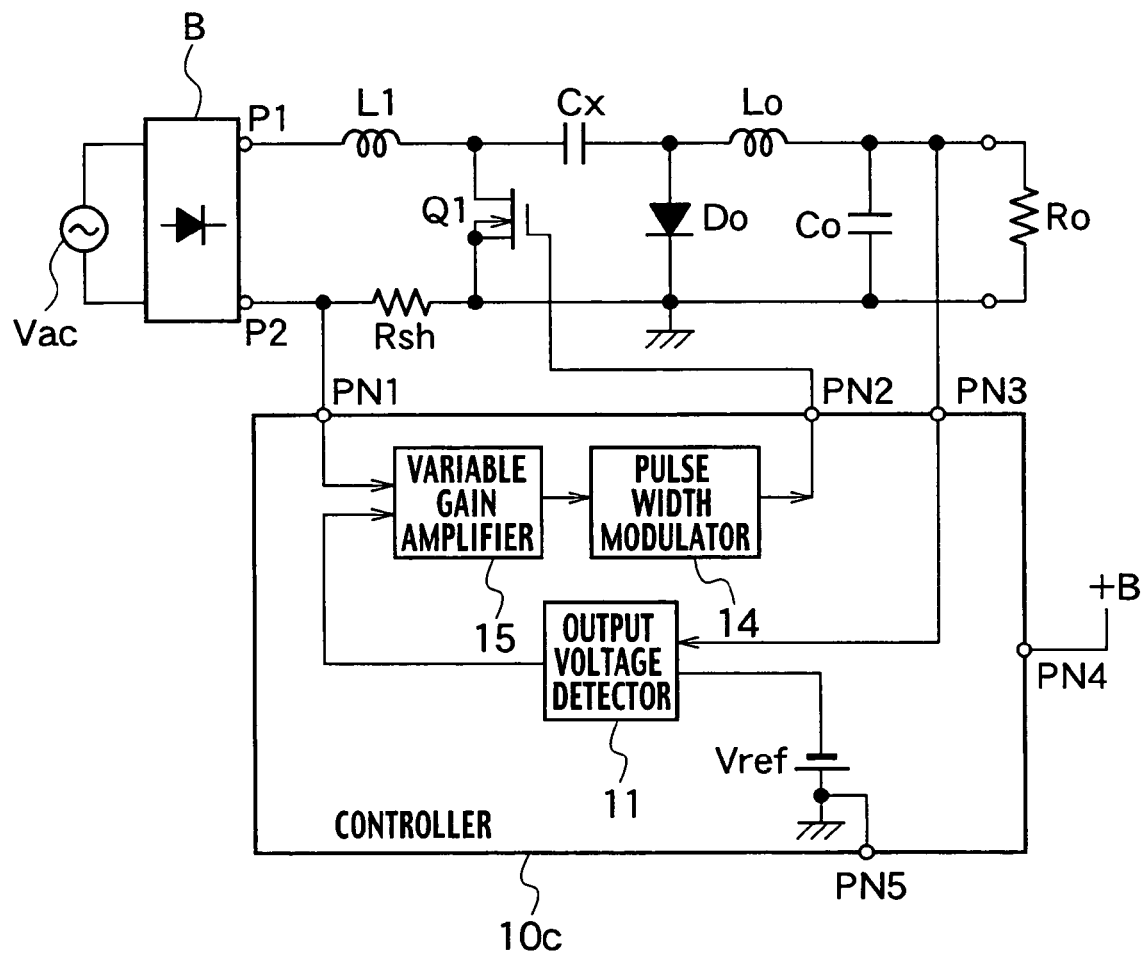
FIG. 9 is a block diagram of a power factor improving circuit according to a third embodiment.

FIG. 9 is a block diagram showing a power factor improving circuit according to a third embodiment. The power factor improving circuit is applied to a converter which is so-called a choke converter. The third embodiment is different from the first embodiment in the structure of a rectification smoothing circuit connected to both ends of the switch Q1. The rectification smoothing circuit comprises a first series circuit including a diode Do and a capacitor Cx connected to both ends (between drain and source) of the switch Q1, and a second series circuit including a smoothing capacitor Co and a reactor Lo connected to both ends of the diode Do. A controller 10c is different from the controller 10a shown in FIG. 2 in that a negative pole of a reference voltage Vref is connected to an operational amplifier 11 as an output voltage detector, and a positive pole is grounded.

The power factor improving circuit according to this embodiment is also operated in the same manner as that of the power factor improving circuit shown in FIG. 2. In this case, input voltage Ei and input voltage Es of the pulse width modulator 14 which are voltages of both ends of the full-wave rectification circuit B have each a relationship of Es=Ei/(Eo+Ei). Therefore, the output voltage Eo is DC and substantially the constant value and thus, the output voltage Eo is substantially sinusoidal wave input current, but can clear a value of higher harmonic wave limit. Further, the same effect as that of the first embodiment can be obtained.

Fourth Embodiment

FIG. 10 is a block diagram showing a power factor improving circuit according to a fourth embodiment. The power factor improving circuit shown in FIG. 10 is applied to a converter which is so-called a sepic converter. The fourth embodiment is different from the first embodiment in a structure of the rectification smoothing circuit which is connected to both ends of the switch Q1. The rectification smoothing circuit comprises a first series circuit including a reactor Lo and a capacitor Cx connected to both ends (between drain and source) of the switch Q1, and a second series circuit including a smoothing capacitor Co and a diode Do connected to both ends of the reactor Lo.

The power factor improving circuit according to the fourth embodiment is also operated in the same manner as that of the power factor improving circuit shown in FIG. 2, and substantially sinusoidal wave input current can be obtained. Further, the same effect as that of the first embodiment can be obtained.

Fifth Embodiment

Figure 11:
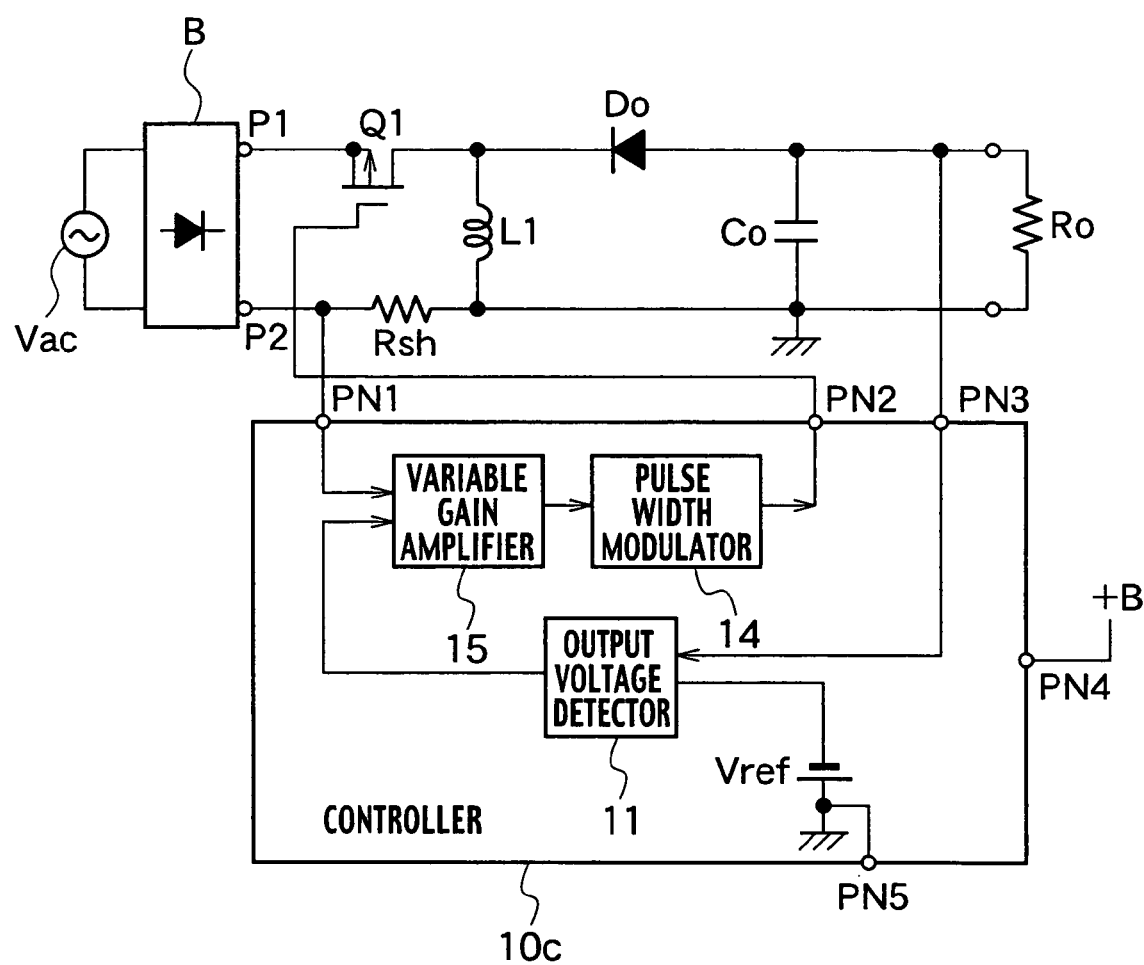
FIG. 11 is a block diagram of a power factor improving circuit according to a fifth embodiment.

FIG. 11 is a block diagram showing a power factor improving circuit according to a fifth embodiment. The power factor improving circuit shown in FIG. 11 is applied to a converter which is so-called an inverted type converter. The fifth embodiment is characterized in that one end (source) of the switch Q1 is connected to a positive output end P1 of a full-wave rectification circuit B, the other end (drain) of the switch Q1 is connected to one end of the step up reactor L1 and a cathode of a diode Do, the other end of the step up reactor L1 is connected to a negative side output end P2 of the full-wave rectification circuit B through a current detecting resistor Rsh, an anode of the diode Do is connected to the other end of the step up reactor L1 through the smoothing capacitor Co, and the controller 10c shown in FIG. 9 is used.

The power factor improving circuit according to the fifth embodiment is also operated in the same manner as that of the power factor improving circuit shown in FIG. 2, and substantially sinusoidal wave input current can be obtained. Further, the same effect as that of the first embodiment can be obtained.

Sixth Embodiment

Figure 12:
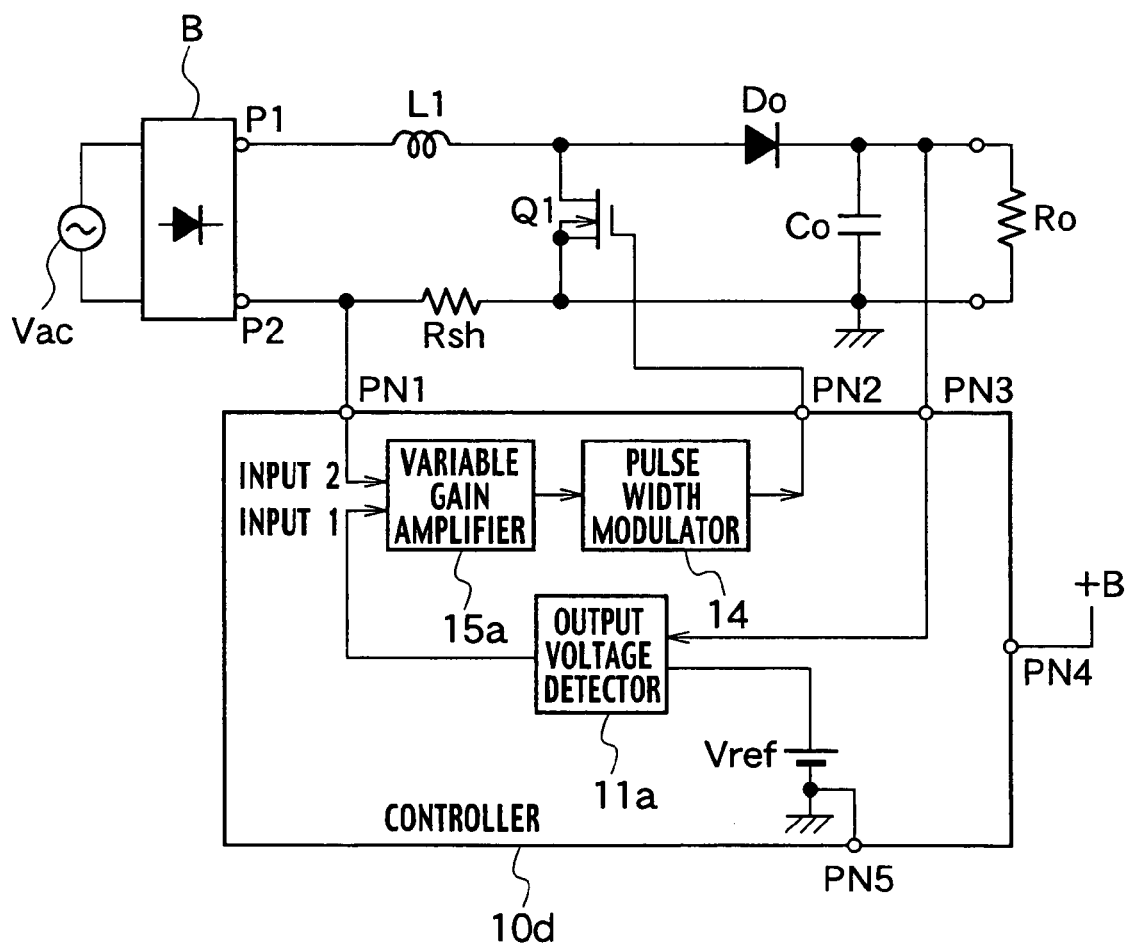
FIG. 12 is a block diagram of a power factor improving circuit according to a sixth embodiment.

FIG. 12 is a block diagram showing a power factor improving circuit according to a sixth embodiment. In the power factor improving circuit shown in FIG. 12, a controller 10d includes a variable gain amplifier 15a, an output voltage detector 11a as the output voltage detector, and a pulse width modulator 14.

The variable gain amplifier 15a has characteristics such that as voltage (variable gain amplifier input 1 signal) from the output voltage detector 11a is increased, a gain thereof is reduced. The variable gain amplifier 15a amplifies voltage being proportional to an input current of half-cycle sinusoidal wave, and outputs the amplified output to the pulse width modulator 14 as a comparison input signal. That is, half-cycle sinusoidal wave voltage is inputted to the pulse width modulator 14. Thus, voltage at both ends of the current detecting resistor Rsh is similar to input of the pulse width modulator 14, and the input current has sinusoidal waveform.

Figure 13:
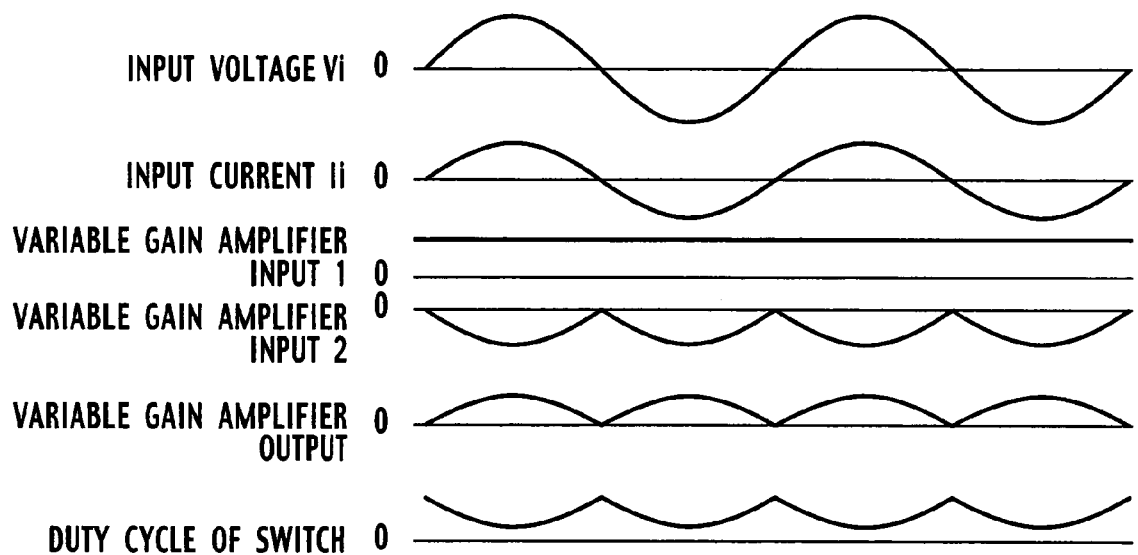
FIG. 13 shows waveforms of various portions of the power factor improving circuit according to the sixth embodiment.

In a case where the output voltage Eo is reduced by some reason, the output voltage detector 11a increases the output voltage in accordance with reduction of the output voltage Eo. The variable gain amplifier 15a reduces the gain by the increase of the output voltage of the output voltage detector 11a, outputs the comparison input signal (in the case of the output 1 shown in FIG. 4), and and the pulse width modulator 14 increases the average duty cycle D of the pulse signal by the reduction of the comparison input signal from the variable gain amplifier 15a. For this reason, the ratio of time during which the switch Q1 is ON, the input current is increased and thus, the output voltage Eo is increased, and the output voltage Eo is held at a constant value. FIG. 13 shows waveforms of various portions at the time. In this embodiment also, the same effect as that of the first embodiment can be obtained.

Seventh Embodiment

Figure 14:
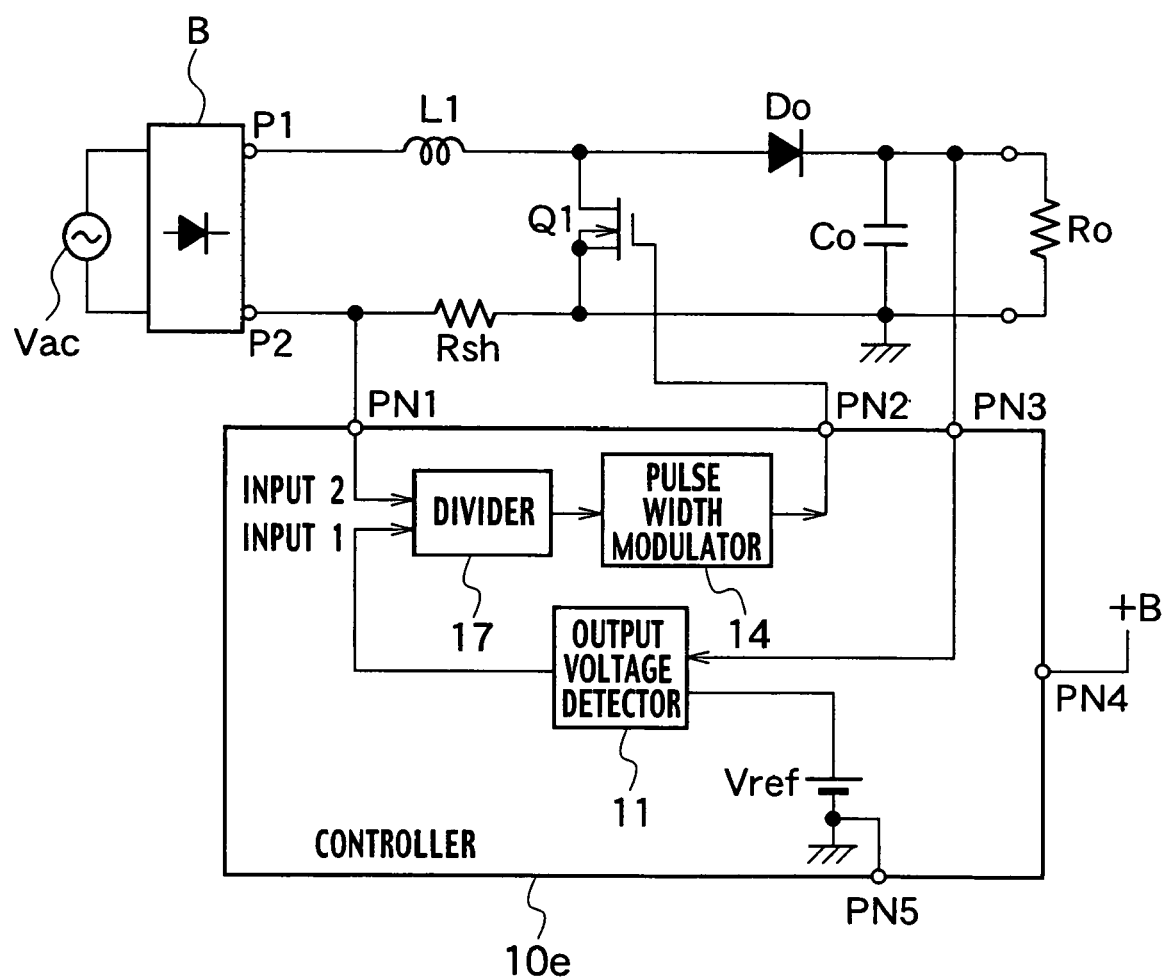
FIG. 14 is a block diagram of a power factor improving circuit according to a seventh embodiment.

FIG. 14 is a block diagram showing a power factor improving circuit according to a seventh embodiment. In the power factor improving circuit shown in FIG. 14, a controller 10e comprises a divider 17 as a variable gain amplifier, an operational amplifier 11 as an output voltage detector, and a pulse width modulator 14.

The divider 17 divides voltage being proportional to current detected by a current detecting resistor Rsh by output voltage of the output voltage detector 11. Here, the pulse width modulator 14 has characteristics as shown in FIG. 5A.

Figure 15:
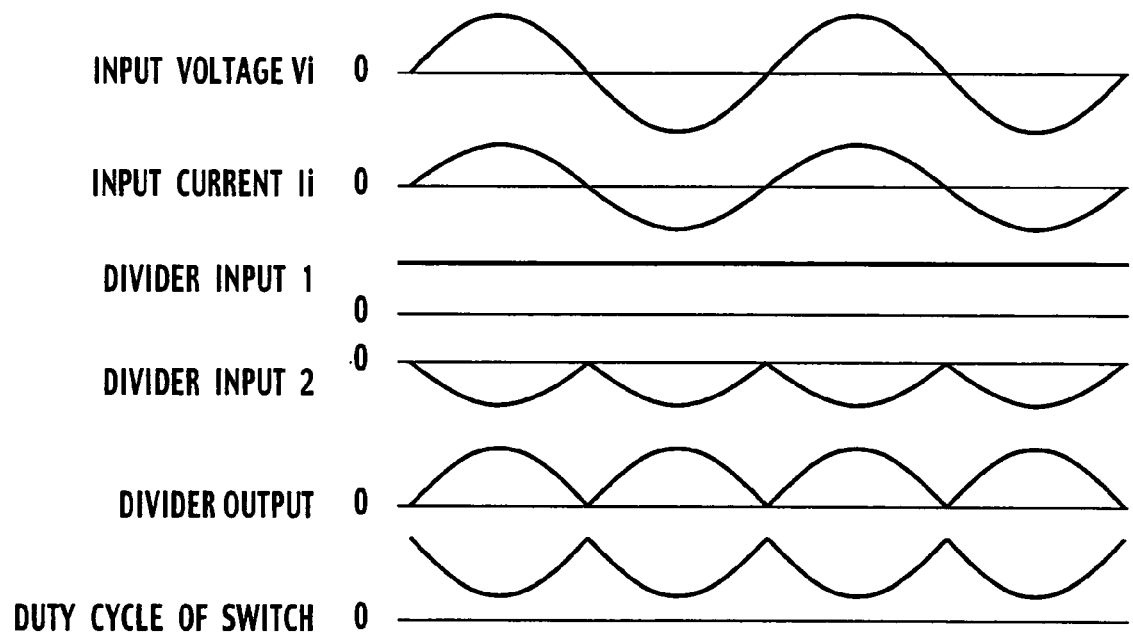
FIG. 15 shows waveforms of various portions of the power factor improving circuit according to the seventh embodiment.

According to such a structure, output voltage (DC voltage) of the output voltage detector 11 is inputted to the divider 17 as "divider input 1" as shown in FIG. 15, and voltage Vrsh being proportional to current detected by the current detecting resistor Rsh is inputted to the divider 17 as "divider input 2" as shown in FIG. 15. The divider 17 calculates (−1×"divider input 2"÷"divider input 1"), and outputs "divider output" shown in FIG. 15.

Since the pulse width modulator 14 has the characteristics as shown in FIG. 5A, the duty cycle of the switch Q1 is as shown in FIG. 15. In the seventh embodiment also, the same effect as that of the first embodiment can be obtained.

It is also possible to exchange the input 1 and the input 2 of the divider in FIG. 14, and the divider may calculate (−1×"divider input 1"÷"divider input 2"). In this case, the current waveform of "divider input 1" is not sinusoidal wave, but can clear a value of higher harmonic wave limit.

Eighth Embodiment

Figure 16:
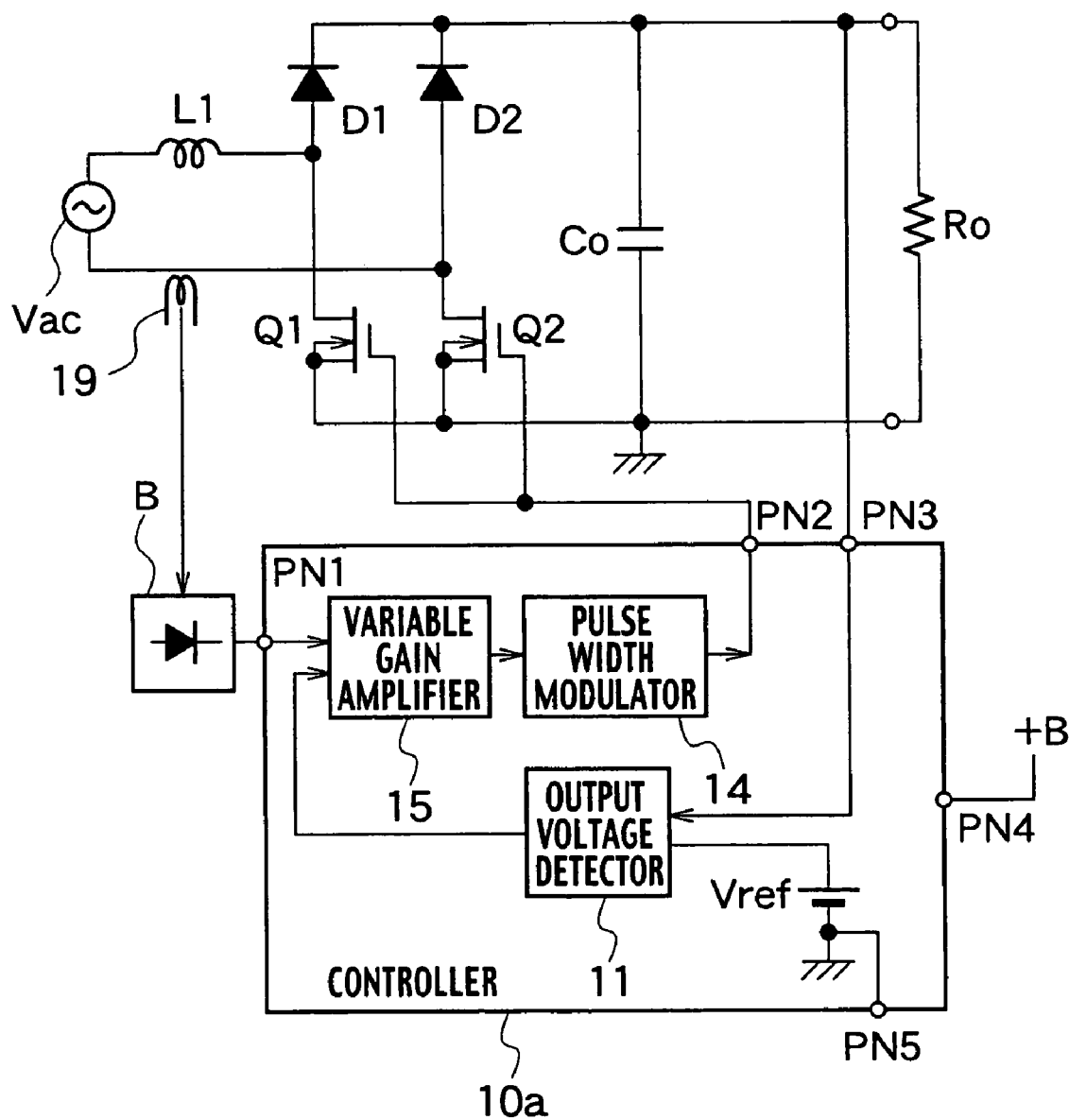
FIG. 16 is a block diagram of a power factor improving circuit according to an eighth embodiment.

FIG. 16 is a block diagram showing a power factor improving circuit according to an eighth embodiment. The power factor improving circuit according to the eighth embodiment is applied to a step up type bridge converter. The power factor improving circuit includes: a series circuit comprising an AC power supply Vac and a step up reactor L1; a bridge circuit being connected to both ends of the series circuit and which comprises a diode D1, a diode D2, a switch Q1 and a switch Q2; a smoothing capacitor Co being connected to a connection between the diode D1 and the diode D2 and to a connection between the switch Q1 and the switch Q2; and a load Ro being connected to the smoothing capacitor Co in series.

The power factor improving circuit includes a current transformer (CT) 19 which detects AC current of the AC power supply Vac, a full-wave rectification circuit B which rectifies AC current from the current transformer 19, and a controller 10a.

According to the power factor improving circuit according to the eighth embodiment, the full-wave rectification circuit B rectifies AC current detected by the current transformer 19, and outputs half-cycle sinusoidal wave to the variable gain amplifier 15 as a current signal. The variable gain amplifier 15 outputs the amplified output to the pulse width modulator 14 having the characteristics shown in FIG. 5B. The pulse width modulator 14 applies the pulse signal to the switches Q1 and Q2, and turns the switches Q1 and Q2 ON/OFF simultaneously. If the two switches Q1 and Q2 are turned ON simultaneously, current conducts through Vac→L1→Q1→Q2→Vac or Vac→Q2→Q1→L1→Vac, and energy is accumulated in the step up reactor L1.

As the two switches Q1 and Q2 are turned OFF simultaneously, the energy accumulated in the step up reactor L1 passes through either one of the diode D1 and the diode D2 to charge the capacitor Co. In this embodiment also, since the waveform obtained by rectifying the current of the current transformer 19 and the waveform of input voltage of the pulse width modulator 14 are the same, the input current can be brought into sinusoidal wave.

Ninth Embodiment

Figure 17:
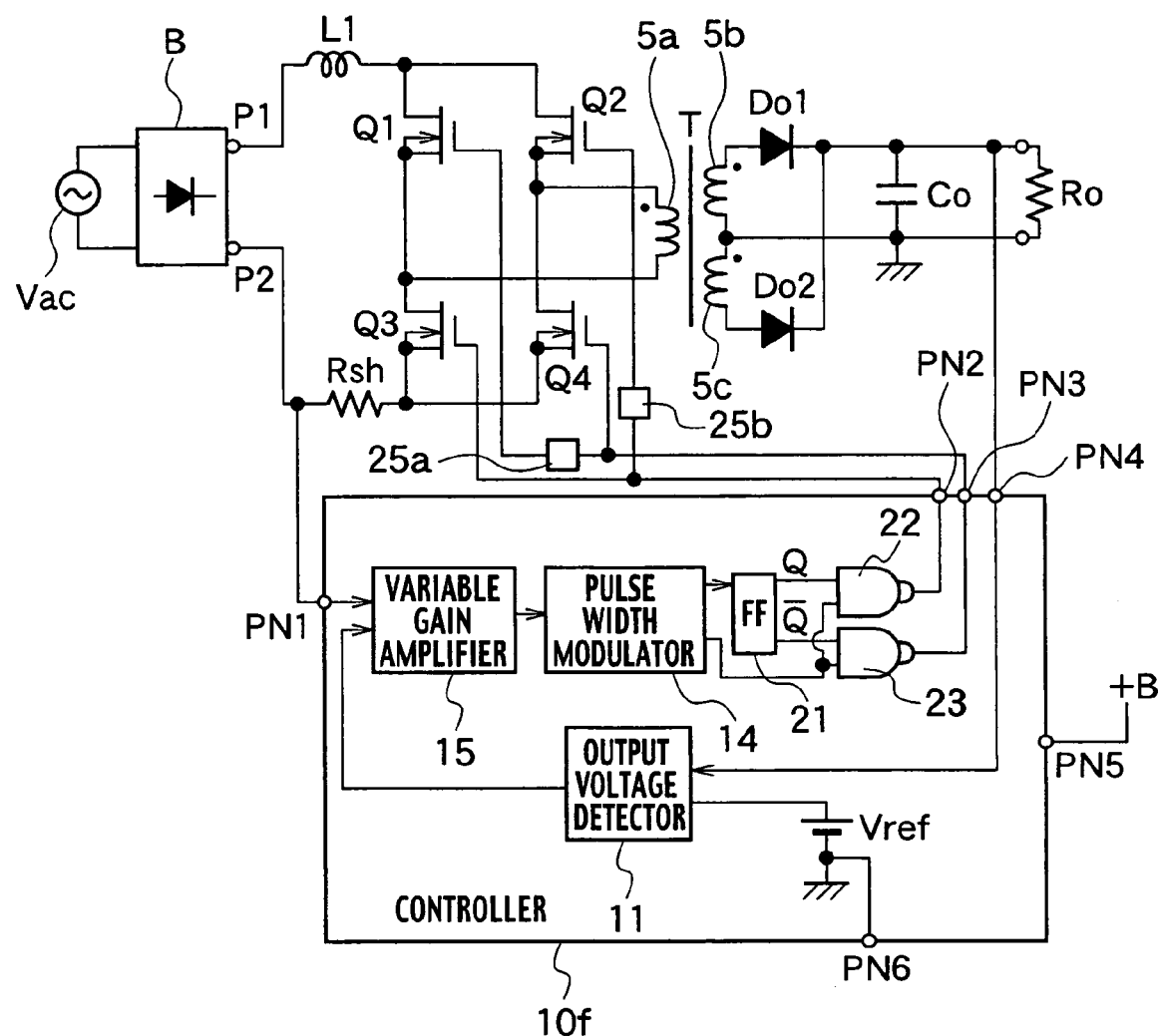
FIG. 17 is a block diagram of a power factor improving circuit according to a ninth embodiment.

FIG. 17 is a block diagram showing a power factor improving circuit according to a ninth embodiment. The power factor improving circuit shown in FIG. 17 is applied to an insulative converter. A series circuit comprising a step up reactor L1, a switch Q1, a switch Q3 and a current detecting resistor Rsh is connected to both ends of a full-wave rectification circuit B which rectifies AC current of an AC power supply Vac. A series circuit comprising a switch Q2 and a switch Q4 is connected to a connection between the step up reactor L1 and the switch Q1, and to a connection between the switch Q2 and the switch Q4. A primary winding 5a of a transformer T is connected to the connection between the switches Q1 and Q3, and to the connection between the switches Q2 and Q4.

A series circuit having a diode Do1 and a diode Do2 is connected to both ends of a series circuit of a secondary winding 5b and a third winding 5c of the transformer T, and the smoothing capacitor Co is connected to a connection between the secondary winding 5b and the third winding 5c and to a connection between the diode Do1 and the diode Do2. A load Ro is connected to both ends of the smoothing capacitor Co.

A controller 10f includes an operational amplifier 11 as an output voltage detector, a variable gain amplifier 15, a pulse width modulator 14, a flip-flop (FF) 21 which inputs clock of the pulse width modulator 14, a NAND logic 22 which inputs one of outputs Q of the FF 21 and a pulse signal of the pulse width modulator 14, and a NAND logic 23 which inputs the other output (inverted output of the output Q) of the FF 21 and a pulse signal of the pulse width modulator 14. The FF 21 and the NAND logic circuits 22 and 23 constitute switch controller of the present invention.

Figure 18:
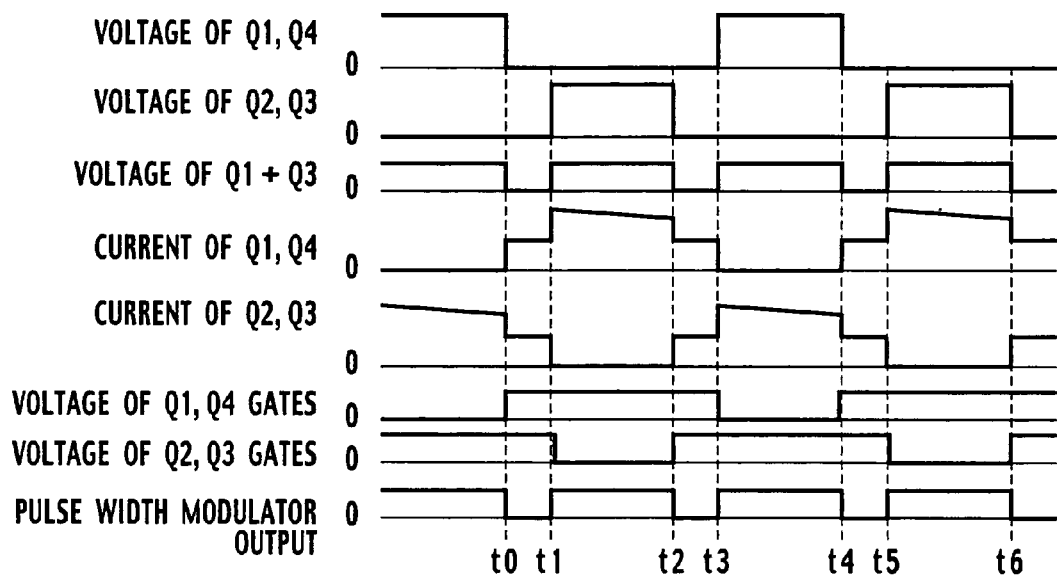
FIG. 18 shows waveforms of various portions of the power factor improving circuit according to the ninth embodiment.

The operation according to this embodiment will be explained with reference to waveforms of various portions shown in FIG. 18. First, voltage being proportional to current detected by the current detecting resistor Rsh and DC voltage as output voltage from the output voltage detector 11 are inputted to the variable gain amplifier 15. The output of the variable gain amplifier 15 is inputted to the pulse width modulator 14, and output of the pulse width modulator 14 is outputted to the FF 21.

Clock signal is outputted from the pulse width modulator 14 to the FF 21, and the FF 21 is driven. The FF 21 inverts high level and low level in synchronization with the clock (t1, t3, t5, etc.). In the example as shown in FIG. 18, the FF 21 inverts the level in synchronization with the rising edge of the clock. The one output Q of the FF 21 and the pulse signal of the pulse width modulator 14 are inputted to the NAND logic 22. The other output (inverted output of the output Q) of the FF 21 and the pulse signal of the pulse width modulator 14 are inputted to the NAND logic 23.

The output of the NAND logic 22 is applied to a gate of the switch Q3, and is applied to the switch Q2 through a high-side driver 25b. The output of the NAND logic 23 is applied to a gate of the switch Q4 and to a gate of the switch Q1 through a high-side driver 25a.

The ON/OFF operation of the switches Q1 to Q4 will be explained with reference to FIG. 18. First, at time t0, the switches Q1 and Q4 are simultaneously turned ON by the output simultaneously turned ON by the output of the NAND logic 22. Therefore, the voltages of the switches Q1 and Q4 become zero and voltages of the switches Q2 and Q3 also become zero. At this time, current conducts through B→L1→Q1→Q3→Rsh→B. Further, current conducts through B→L1→Q2→Q4→Rsh→B.

Next, at time t1, the switches Q2 and Q3 are simultaneously turned OFF by the output of the NAND logic 22. Thus, the voltages of the switches Q2 and Q3 are increased, and current becomes zero. At this time, current conducts through B→L1→Q1→5a→Q4→Rsh→B, and current of the switches Q1 and Q4 is increased.

Next, at time t2, the switches Q2 and Q3 are simultaneously turned ON by the output of the NAND logic 22. Thus, voltages of the switches Q2 and Q3 become zero. That is, the operation at this time is the same as the operation at time T0. At time t1 to time t2, current conducts through 5c→Do2→Co→5c, and DC electricity is supplied to the load Ro.

Next, at time t3, the switches Q1 and Q4 are simultaneously turned OFF by the output of the NAND logic 23. Thus, the voltages of the switches Q1 and Q4 are increased and the current becomes zero. At this time, current conducts through B→L1→Q2→5a→Q3→Rsh→B, and current of the switches Q2 and. Q3 is increased. At time t3 to time t4, current conducts through 5b→Do1→Co→5b, and DC electricity is supplied to the load Ro.

In this embodiment also, the same effect as that of the first embodiment can be obtained.

Specific Example of the Variable Gain Amplifier

Figure 19A:
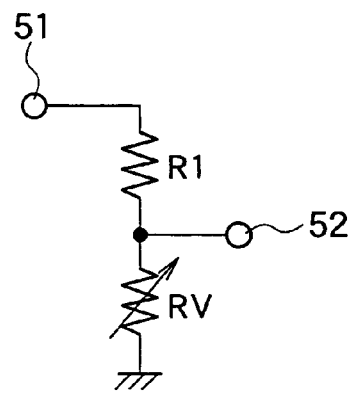
FIGS. 19A and 19B are block diagrams showing one example of a variable gain amplifier.
Figure 19B:
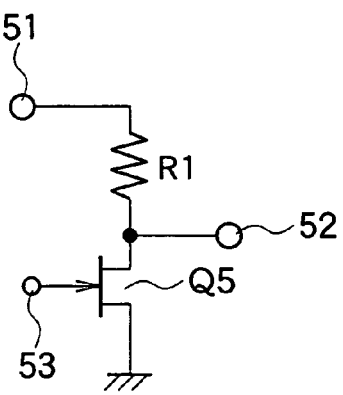

FIGS. 19A and 19B are block diagrams showing one example of the variable gain amplifier. FIG. 19A shows a principle of the variable gain amplifier. The variable gain amplifier is a potentiometer comprising a resistor R1, and a gain adjusting variable resistor Rv connected to the resistor R1 in series. An input signal is inputted to an input terminal to which one end of the resistor R1 is connected, and output is supplied to an output terminal 52 from a connection between the resistor R1 and the variable resistor Rv. In this case, the gain is less than 1.

FIG. 19B shows a specific example of the principle shown in FIG. 19A. This example comprises an FETQ 5 which includes a drain, a source and a gate and whose resistor value is varied by voltage being applied to the gate, and the resistor R1 whose one end is connected to the drain of the FETQ 5. Voltage being proportional to current detected by the current detecting resistor Rsh is inputted to the input terminal 51 being connected to the other end of the resistor R1, the error voltage of the output voltage detector 11 is applied to the gate terminal 53 of the FETQ 5, and output is supplied to the output terminal 52 from a connection between the resistor R1 and the drain of the FETQ 5.

Since the resistor value of the FETQ 5 is varied by the value of voltage being inputted to the gate of the FETQ 5, thus the gain is varied.

Figure 20A:
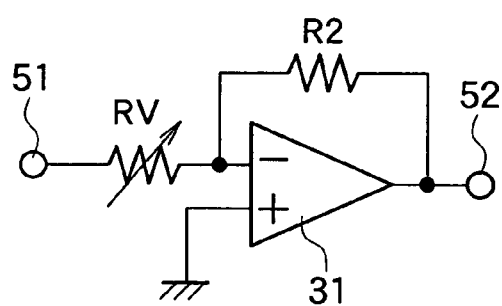
FIGS. 20A and 20B are block diagrams showing another example of the variable gain amplifier.
Figure 20B:
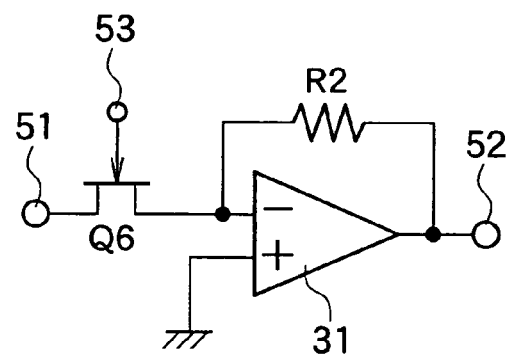

FIGS. 20A and 20B are block diagrams shown another example of the variable gain amplifier. FIG. 20A shows a principle of the variable gain amplifier. The variable gain amplifier includes a variable resistor Rv and an operational amplifier 31 whose inverted terminal is connected to one end of the variable resistor Rv. A feedback resistor R2 is connected to the inverted terminal and the output terminal of the operational amplifier 31, and the non-inverted terminal is grounded. An input signal is inputted to the input terminal 51 being connected to one end of the variable resistor Rv, and output is taken out from the output terminal 52. The gain at the time is expressed by −R2/Rv.

FIG. 20B shows a specific example of the principle shown in FIG. 20A. This example comprises an FETQ 6 which includes a drain, a source and a gate and whose resistor value is varied by voltage applied to the gate, and an operational amplifier 31 whose inverted terminal is connected to the drain of the FETQ 6 and whose feedback resistor R2 is connected to the inverted terminal and the output terminal. Voltage being proportional to current detected by the current detecting resistor Rsh is inputted to the input terminal 51 being connected to the source of the FETQ 6, error voltage of the output voltage detector 11 is applied to the gate terminal 53 of the FETQ 6, and output is taken out to the output terminal 52.

Since the resistor value of the FETQ 6 is varied by the voltage value being inputted to the gate of the FETQ 6, thus the gain is largely varied.

Figure 21:
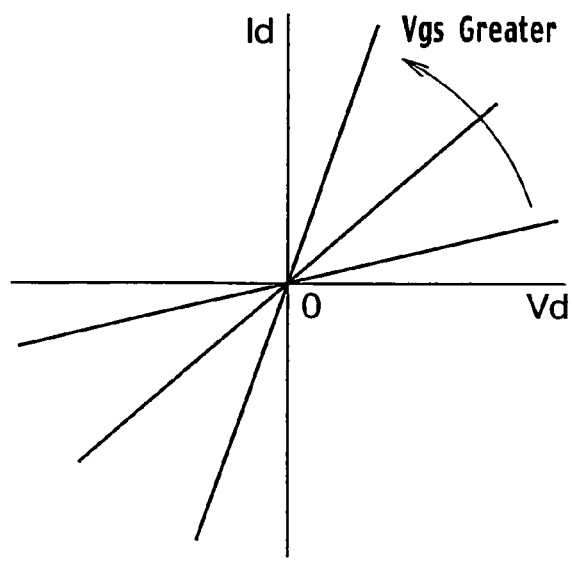
FIG. 21 shows FET characteristics used for the variable gain amplifier.

FIG. 21 shows characteristics of an FET used for the variable gain amplifier. FIG. 21 shows characteristics of drain voltage Vd and drain current Id of the FET, and the characteristics are varied by variation in voltage Vgs between the gate and source. That is, in the FET, the inclination of the graph is varied depending upon the magnitude of the gate signal, and the resistor value is varied.

The present invention is not limited to the first to the ninth embodiments. The current to be detected is not limited to the input current, but also current of a switch such as the FET or current of rectification diode can also be detected, and an average value of the current, a peak value or an effective value may be detected. In this case, the input current does not become precise sinusoidal wave in some cases, but the input current can be brought into a value capable of clearing a standard value of higher harmonic wave limit.

The pulse width modulator 14 may modulate not only pulse width having fixed frequency, but also OFF width having constant ON width, ON width which is varied while OFF width is constant, ON width and OFF width and frequency which are all varied, only if the ratio between ON and OFF is varied. In the present invention, two or more of the first to the ninth embodiments may be combined.

According to the present invention, the number of parts of a power factor improving circuit is reduced, and a structure of the circuit is simplified. With this structure, the circuit can inexpensively and easily be adjusted. Since the number of negative feedback loops can be reduced, the circuit can be controlled stably. Since the number of wires is reduced, the circuit can easily be formed into an IC form, and an inexpensive IC can be provided.

This application claims benefit of priority under 35USC §119 to Japanese Patent Applications No. 2003-342148, filed on Sep. 30, 2003, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A power factor improving circuit in which AC power supply voltage of an AC power supply is rectified by a rectification circuit to obtain rectified voltage, the rectified voltage is inputted to a series circuit comprising a step up reactor and a main switch, the main switch being turned ON/OFF to improve a power factor of the AC power supply, and DC output voltage being obtained by a rectification smoothing circuit, the power factor improving circuit comprising:

a current detector detecting current conducting through the step up reactor or current conducting through the main switch;

an error voltage generator amplifying a difference between the output voltage and a reference voltage to generate an error voltage;

a variable gain amplifier amplifying voltage being proportional to current detected by the current detector by varying a gain in accordance with a value of the error voltage; and a pulse width controller generating a pulse signal whose pulse width is controlled in accordance with a value of output of the variable gain amplifier that has a negative correlation with a duty of the pulse signal, and applying the pulse signal to the main switch to control the output voltage with respect to predetermined voltage.

2. The power factor improving circuit according to claim 1, further comprising a peak detector detecting a peak value of the current being detected by the current detector, and outputting voltage being proportional to the peak value to the variable gain amplifier.

3. The power factor improving circuit according to claim 1, wherein the variable gain amplifier comprises a divider in which voltage being proportional to current detected by the current detector is divided by the error voltage.

4. The power factor improving circuit according to claim 2, wherein the variable gain amplifier comprises a divider in which voltage being proportional to current detected by the current detector is divided by the error voltage.

5. The power factor improving circuit according to claim 1, wherein the rectification smoothing circuit includes:

a first series circuit comprising a capacitor and a diode being connected to both ends of the main switch, and a second series circuit comprising a reactor and a smoothing capacitor being connected to both ends of the diode.

6. The power factor improving circuit according to claim 2, wherein
the rectification smoothing circuit includes:
a first series circuit comprising a capacitor and a diode being connected to both ends of the main switch, and
a second series circuit comprising a reactor and a smoothing capacitor being connected to both ends of the diode.

7. The power factor improving circuit according to claim 3, wherein
the rectification smoothing circuit includes:
a first series circuit comprising a capacitor and a diode being connected to both ends of the main switch, and
a second series circuit comprising a reactor and a smoothing capacitor being connected to both ends of the diode.

8. The power factor improving circuit according to claim 1, wherein
the rectification smoothing circuit includes:
a first series circuit being connected to both ends of the main switch and comprising a capacitor and a reactor, and
a second series circuit being connected to both ends of the reactor and comprising a diode and a smoothing capacitor.

9. The power factor improving circuit according to claim 2, wherein
the rectification smoothing circuit includes:
a first series circuit being connected to both ends of the main switch and comprising a capacitor and a reactor, and
a second series circuit being connected to both ends of the reactor and comprising a diode and a smoothing capacitor.

10. The power factor improving circuit according to claim 3, wherein
the rectification smoothing circuit includes:
a first series circuit being connected to both ends of the main switch and comprising a capacitor and a reactor, and
a second series circuit being connected to both ends of the reactor and comprising a diode and a smoothing capacitor.

11. A power factor improving circuit which obtains DC output voltage, the circuit comprising: a first series circuit including an AC power supply and a step up reactor; a bridge circuit being connected to both ends of the first series circuit and including a first diode, a second diode, a first switch and a second switch; and a smoothing capacitor being connected to a connection between the first diode and the second diode, and to a connection between the first switch and the second switch; in which the first switch and the second switch are simultaneously turned ON/OFF to improve a power factor of the AC power supply, the circuit further comprising:
a current detector detecting AC current conducting through the first series circuit;
a rectification circuit rectifying the detected AC current;
an error voltage generator amplifying a difference between the output voltage and a reference voltage to generate an error voltage;
a variable gain amplifier amplifying voltage being proportional to current rectified by the rectification circuit by varying gain in accordance with a value of the error voltage; and
a pulse width controller generating a pulse signal whose pulse width is controlled in accordance with a value of output of the variable gain amplifier, and which applies the pulse signal to the first switch and the second switch to control the output voltage with respect to predetermined voltage.

12. A power factor improving circuit which obtains DC output voltage, the circuit comprising: a first series circuit being connected to both ends of a rectification circuit which rectifies AC power supply voltage of an AC power supply and which includes a step up reactor, a first switch, a third switch and a current detector; a second series circuit being connected to a connection between the step up reactor and the first switch and to a connection between the third switch and the current detector and which includes a second switch and a fourth switch; a primary winding of a transformer connected to a connection between the first switch and the third switch and to a connection between the second switch and the fourth switch; and a rectification smoothing circuit which rectifies and smoothens voltage of secondary output winding of the transformer; in which the first to the fourth switches are turned ON/OFF to improve a power factor of the AC power supply, the circuit further comprising:
an error voltage generator amplifying a difference between the output voltage and a reference voltage to generate an error voltage;
a variable gain amplifier amplifying voltage being proportional to current detected by the current detector by varying gain in accordance with a value of the error voltage;
a pulse width control device generating a pulse signal whose pulse width is controlled in accordance with a value of output of the variable gain amplifier; and
a switch control device generating a pulse inverted signal obtained by inverting the pulse signal, which applies one of the pulse signal and the pulse inverted signal to the second switch and the third switch, which applies the other one of the pulse signal and the pulse inverted signal to the first switch and the fourth switch, and which ON/OFF controls the first to the fourth switches to control the output voltage with respect to predetermined voltage.

13. The power factor improving circuit according to claim 1, wherein
the variable gain amplifier comprises: a semiconductor device which includes a first main electrode, a second main electrode and a control electrode and which varies a resistor value by voltage applied to the control electrode; and a stationary resistor whose one end is connected to the first main electrode of the semiconductor device; and
voltage being proportional to current detected by the current detector is inputted to the other end of the stationary resistor, and error voltage of the error voltage generator is applied to the control electrode of the semiconductor device.

14. The power factor improving circuit according to claim 11, wherein
the variable gain amplifier comprises: a semiconductor device which includes a first main electrode, a second main electrode and a control electrode and which varies a resistor value by voltage applied to the control electrode; and a stationary resistor whose one end is connected to the first main electrode of the semiconductor device; and
voltage being proportional to current detected by the current detector is inputted to the other end of the stationary resistor, and error voltage of the error voltage generator is applied to the control electrode of the semiconductor device.

15. The power factor improving circuit according to claim 12, wherein the variable gain amplifier comprises: a semiconductor device which includes a first main electrode, a second main electrode and a control electrode and which varies a resistor value by voltage applied to the control electrode; and a stationary resistor whose one end is connected to the first main electrode of the semiconductor device; and voltage being proportional to current detected by the current detector is inputted to the other end of the stationary resistor, and error voltage of the error voltage generator is applied to the control electrode of the semiconductor device.

16. The power factor improving circuit according to claim 1, wherein the variable gain amplifier comprises: a semiconductor device which includes a first main electrode, a second main electrode and a control electrode and which varies a resistor value by voltage applied to the control electrode; and a operational amplifier having an inverted terminal connected to the first main electrode of the semiconductor device and having a feedback resistor connected to the inverted terminal and the output terminal; and voltage being proportional to current detected by the current detector is inputted to the other end of the stationary resistor, and error voltage of the error voltage generator is applied to the control electrode of the semiconductor device.

17. The power factor improving circuit according to claim 11, wherein the variable gain amplifier comprises: a semiconductor device which includes a first main electrode, a second main electrode and a control electrode and which varies a resistor value by voltage applied to the control electrode; and a operational amplifier having an inverted terminal connected to the first main electrode of the semiconductor device and having a feedback resistor connected to the inverted terminal and the output terminal; and voltage being proportional to current detected by the current detector is inputted to the other end of the stationary resistor, and error voltage of the error voltage generator is applied to the control electrode of the semiconductor device.

18. The power factor improving circuit according to claim 12, wherein the variable gain amplifier comprises: a semiconductor device which includes a first main electrode, a second main electrode and a control electrode and which varies a resistor value by voltage applied to the control electrode; and a operational amplifier having an inverted terminal connected to the first main electrode of the semiconductor device and having a feedback resistor connected to the inverted terminal and the output terminal; and voltage being proportional to current detected by the current detector is inputted to the other end of the stationary resistor, and error voltage of the error voltage generator is applied to the control electrode of the semiconductor device.

19. The power factor improving circuit according to claim 1, wherein the current detector is connected in series with the series circuit.

* * * * *